No. 790,443. PATENTED MAY 23, 1905.
G. LETTENMYER.
HARROW.
APPLICATION FILED JAN. 23, 1905.
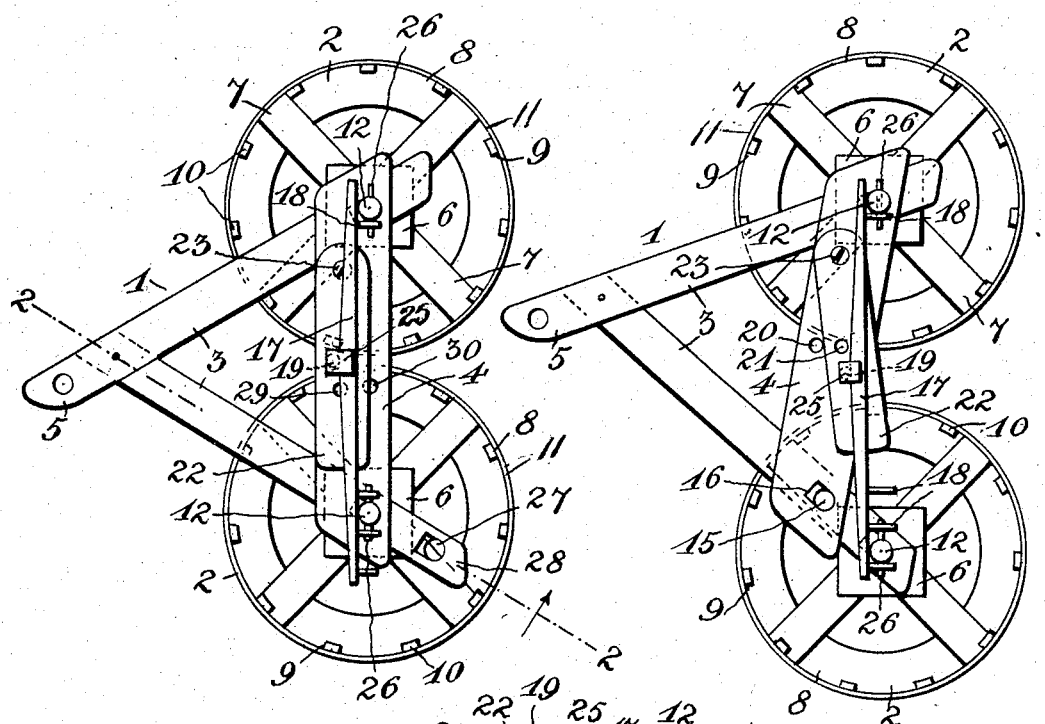
Inventor
Geo. Lettenmyer
by H. R. Willson
Attorney
Witnesses
C. Mumm
C. H. Griesbauer No. 790,443. Patented May 23, 1905.

UNITED STATES PATENT OFFICE.

GEORGE LETTENMYER, OF BERRYVILLE, VIRGINIA, ASSIGNOR OF ONE-HALF TO WILLIAM W. SMALLWOOD, OF BERRYVILLE, VIRGINIA.

HARROW.

SPECIFICATION forming part of Letters Patent No. 790,443, dated May 23, 1905.

Application filed January 23, 1905. Serial No. 242,315.

*To all whom it may concern:*

Be it known that I, GEORGE LETTENMYER, a citizen of the United States, residing at Berryville, in the county of Clarke and State of Virginia, have invented certain new and useful Improvements in Harrows; and I do declare the following to be a full, clear, and exact description of the invention, such as will enable others skilled in the art to which it appertains to make and use the same.

My invention relates to improvements in harrows, and more particularly to one which may be adapted for use as a cultivator.

The object of the invention is to provide a machine of this character which will be simple and comparatively inexpensive in construction, convenient and durable in use, and highly efficient in operation.

With the above and other objects in view the invention consists of certain novel features of construction, combination, and arrangement of parts, as will be hereinafter described and claimed.

In the accompanying drawings, Figure 1 is a top plan view of a harrow constructed in accordance with my invention. Fig. 2 is a vertical sectional view taken on the line 2 2 in Fig. 1 and looking in the direction indicated by the arrow. Fig. 3 is a rear elevation of the machine; and Fig. 4 is a view simliar to Fig. 1, showing the machine adapted for use as a cultivator.

Referring to the drawings by numerals, 1 denotes a suitable frame upon which are journaled horizontally-disposed earth-working wheels 2. Two of these wheels are preferably provided, and they are mounted upon opposite sides of the frame 1, which latter is preferably of triangular form, consisting of two forwardly-converging side beams 3, connected adjacent to their rear ends by a cross-beam 4. Any suitable clevis or draft connection may be provided at the front end 5 of one of the beams 3 for the purpose of connecting draft-animals which draw the machine forwardly.

Each of the earth-working wheels 2 comprises a head or hub 6, secured to crossed beams 7, which form the spokes of the wheel and which have their outer ends connected by a circular rim or felly 8. At suitable intervals around the periphery of the felly 8 are formed notches 9, which are provided to receive vertically-projecting harrow teeth or spikes 10. These teeth 10 are retained in the notches 9 by a tire or band 11, which is secured upon the periphery of the felly 8, the upper portions of the teeth being slightly wedge-shaped to permit them to be fastened more securely. The harrow-teeth 10 shown in the drawings are in the form of straight spikes which have pointed lower ends; but it will be understood that any other suitable form of harrow-teeth may be substituted and they may be secured to the wheels 2 in any desired manner.

Projecting vertically from the center of the head or hub 6 of each of the wheels 2 is a journal or shaft 12, which is adapted to be removably journaled in vertically-disposed openings or slots formed in the side beams 3 and the cross-beam 4 of the frame 1. When the machine is to be used as a harrow, the wheels 2 are so mounted that they rotate with their peripheries almost in contact with each other, and in mounting the wheels in this manner their shafts or journals 12 are passed through vertical slots or openings 15, which are formed in the frame 1 at the intersection of its side beams 3 with its cross-beam 4. These openings 15 are circular in form and have their forward walls inclined upwardly and forwardly, as shown at 16, for the purpose of permitting the shafts 12 to tilt vertically in said openings. This tilting movement of the shafts permits the wheels 2 to give or yield when their teeth 10 strike obstructions in the ground, and thereby prevents breakage or damage to the machine, which would otherwise occur. The shafts are held normally in a vertical position by means of a spring-bar 17, which is removably mounted upon the top of the cross-beam 4 and has its ends engaged with the forward faces of said shafts. Stop-pins or studs 18 are provided upon this spring 17, so as to engage the shafts 12 and prevent endwise movement of said spring. The latter is removably mounted by means of a pin or key 19, which is inserted in alining openings 20 and 21, formed, respectively, in the cross-beam 4 and in a bar 22, which is pivoted at one of its ends, as shown at 23, upon the top of said bar 4. The spring 17 rests upon the top of the pivoted bar 22 and is retained thereon by a shoulder 25, which is formed upon the key or pin 19 and which engages the top of said spring, as clearly shown in Fig. 2 of the drawings. The pin or key 19 has its lower end tapered to snugly fit the openings 20 and 21. It will be seen that the ends of the springs 17 maintain the shafts 12 normally in a vertical position; but as soon as the teeth 10 of the wheels 2 strike an obstruction the shafts 12 will tilt forwardly against the tension of said spring.

When it is desired to use the machine as a cultivator, the wheels 2 are adjusted from the position shown in Fig. 1 of the drawings to the position shown in Fig. 4 of the drawings, in which latter position their peripheries are spaced apart, so that the machine may be drawn forwardly over a row of corn or other plants which pass between the wheels, one of the latter being disposed upon each side of the row to cultivate the earth between said row and the adjacent one. As has been stated, the shafts 12 are removably journaled, preferably by passing through their upper ends cross-pins or keys 26, and when the machine is to be used as a cultivator the shaft of one of the wheels is removed from its opening 15 and mounted in a similar manner in an opening 27, formed in an extended rear portion 28 of one of the side beams 3 of the frame. This opening 27 is similar in shape to the openings 15 and is at a greater distance from the opening 15 upon the other side beam than the latter is from the other opening 15. The shaft 12 is retained in the opening 27 in the same manner as in the opening 15, the spring 17 being of sufficient length to engage the ends of the shafts when the latter are mounted in one of the openings 15 and in the opening 27. In order to change the adjustment of the spring 17 so that it exerts its energy to retain the shafts in a vertical position, the pin 19 is removed from the alining openings 20 and 21 and inserted in openings 29 and 30, which are also formed, respectively, in the beam 4 and pivoted bar 22 and which are adapted to aline when the said bar 22 is swung to the position shown in Fig. 4 of the drawings.

The operation, use, and advantages of the invention will be readily understood from the foregoing description, taken in connection with the accompanying drawings. It will be seen that when the wheels 2 are adjusted in the position shown in Fig. 1 of the drawings and the machine is drawn forwardly the wheels will rotate or oscillate, so that their teeth will perform effective work, and should they strike an obstruction the wheels will yield, as previously explained, in order to prevent any breakage or damage to the machine. When the wheels are adjusted to the position shown in Fig. 4 of the drawings, so that they are spaced apart, the machine may be effectively used for cultivating corn or the like. The wheels are preferably of slightly-less diameter than the space between the rows of plants, so that the machine will cultivate practically two rows at the same time. The machine may be readily moved from place to place by tilting it in a vertical plane, so that it may run upon the periphery of one of the wheels 2, as will be readily understood.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. A harrow comprising a frame formed with vertical slots, toothed wheels, shafts for said wheels projecting through said slots, cross-pins in said shafts for retaining the latter in said slots, a spring-bar, stops upon said spring-bar to engage said shafts, and a removable pin or key for securing said bar in engagement with said shafts and upon said frame, substantially as described.

2. A harrow comprising a frame, a horizontally-disposed earth-working wheel journaled upon one side of said frame, a second horizontally-disposed earth-working wheel, and means for journaling the latter upon said frame at different distances from said first-mentioned wheel.

3. A harrow comprising a frame having a bearing-opening upon one of its sides and two or more bearing-openings upon its other side and arranged at different distances from the first-mentioned opening, a horizontally-disposed earth-working wheel having its shaft journaled in the first-mentioned bearing-opening, a second horizontally-disposed earth-working wheel having its shaft journaled in one of the other of said bearing-openings, and means for retaining said shafts in said openings, substantially as described.

4. A harrow comprising a frame having a bearing-opening upon one of its sides and two or more bearing-openings upon its other side and arranged at different distances from the first-mentioned opening, each of said openings having a forwardly and upwardly inclined wall a horizontally-disposed earth-working wheel having its shaft journaled in the first-mentioned bearing-opening, a second horizontally-disposed wheel having its shaft journaled in one of the other of said bearing-openings, and a spring-bar removably mounted upon said frame and engaged with said shafts to maintain them in a vertical position in said bearing-openings, substantially as described.

5. A harrow comprising a substantially triangular frame consisting of two side beams and a connecting cross-beam, one of said side beams being formed with one bearing-opening and the other of said side beams being formed with two bearing-openings arranged at different distances from the bearing-opening in the other side beam, each of said openings having a forwardly and upwardly inclined wall, horizontally-disposed toothed wheels having their vertical shafts projecting upwardly through said bearing-openings, a spring having stops to engage the upper ends of said shafts, a pivoted bar upon the cross-beam of said frame, and a pin passing through registering openings in said bar and said cross-beam and having a shoulder to hold said spring upon said bar, substantially as described.

In testimony whereof I have hereunto set my hand in presence of two subscribing witnesses.

GEORGE LETTENMYER.

Witnesses:
W. E. HOFFMAN,
J. W. FOLEY.